(12) United States Patent
Lee et al.

(10) Patent No.: US 8,045,588 B2
(45) Date of Patent: Oct. 25, 2011

(54) METHOD AND APPARATUS FOR PROVIDING AND RECEIVING THREE-DIMENSIONAL DIGITAL CONTENTS

(75) Inventors: Jae-jun Lee, Seoul (KR); Yong-seok Jang, Hwaseong-si (KR); Seong-sin Joo, Suwon-si (KR); Jae-seung Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 239 days.

(21) Appl. No.: 12/274,864

(22) Filed: Nov. 20, 2008

(65) Prior Publication Data

US 2009/0257452 A1    Oct. 15, 2009

(30) Foreign Application Priority Data

Apr. 15, 2008   (KR) ........................ 10-2008-0034657

(51) Int. Cl.
*H04J 3/24* (2006.01)
(52) U.S. Cl. ........................................................ 370/475
(58) Field of Classification Search .................. None
See application file for complete search history.

(56) References Cited

U.S. PATENT DOCUMENTS

| 5,886,736 | A | * | 3/1999 | Chen | 348/43 |
| 7,177,357 | B2 | * | 2/2007 | Yun et al. | 375/240.01 |
| 2006/0192851 | A1 | * | 8/2006 | Sugahara et al. | 348/51 |
| 2008/0310499 | A1 | * | 12/2008 | Kim et al. | 375/240.01 |
| 2009/0257452 | A1 | * | 10/2009 | Lee et al. | 370/476 |
| 2010/0134592 | A1 | * | 6/2010 | Kim et al. | 348/43 |

FOREIGN PATENT DOCUMENTS

| KR | 10-2005-0111379 A | 11/2005 |
| KR | 10-2007-0043584 A | 4/2007 |
| KR | 10-2007-0061227 A | 6/2007 |

* cited by examiner

*Primary Examiner* — Chi Pham
*Assistant Examiner* — Fan Ng
(74) *Attorney, Agent, or Firm* — Sughrue Mion, PLLC

(57) ABSTRACT

Provided are a method and an apparatus for providing three-dimensional (3D) digital content by using a conventional system for providing two-dimensional (2D) digital content. The method includes generating an elementary stream (ES) regarding first data of 2D digital content, generating an ES regarding second data of 3D digital content, packetizing the ESs of the first data and the second data, and recording) the packetized second data and content information of the second data within header information of multiplexed stream of the packetized first data.

17 Claims, 6 Drawing Sheets

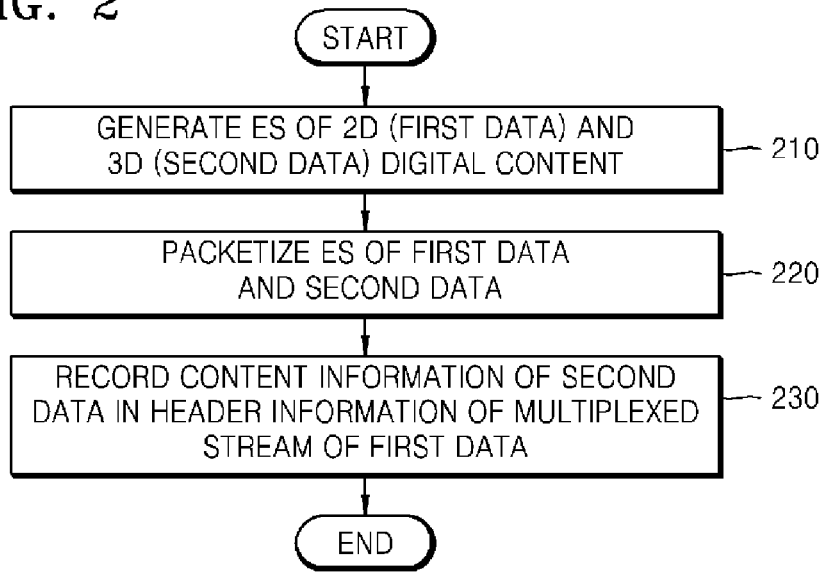
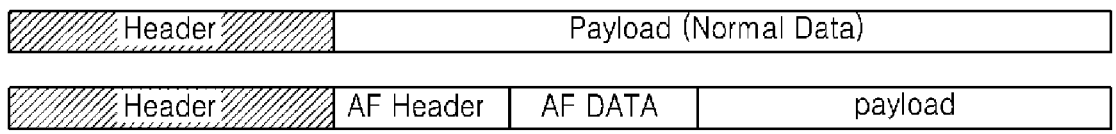
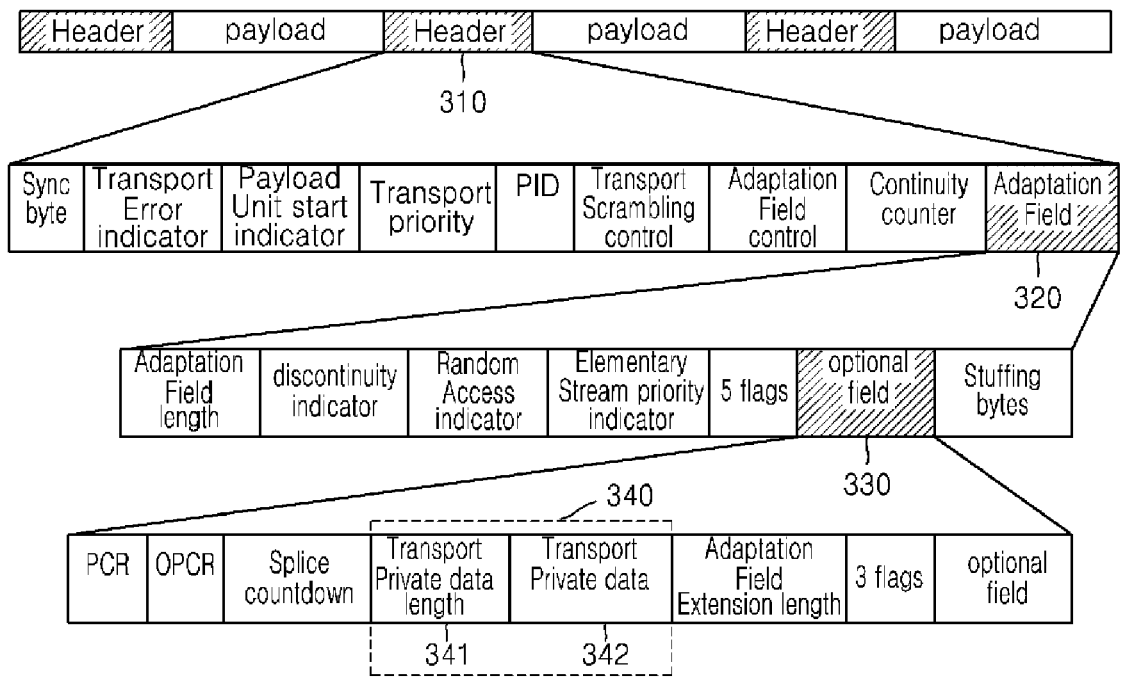

METHOD AND APPARATUS FOR PROVIDING AND RECEIVING THREE-DIMENSIONAL DIGITAL CONTENTS

CROSS-REFERENCE TO RELATED PATENT APPLICATION

This application claims the benefit of Korean Patent Application No. 10-2008-0034657, filed on Apr. 15, 2008, in the Korean Intellectual Property Office, the disclosure of which is incorporated herein in its entirety by reference.

BACKGROUND OF THE INVENTION

1. Field of the Invention

Methods and apparatuses consistent with the present invention relate to providing and receiving three-dimensional (3D) digital contents, and more particularly, to a method and apparatus for providing and receiving 3D digital contents by using a conventional system for providing two-dimensional (2D) digital contents 2. Description of the Related Art As high-quality digital motion picture services have become more popular, an increasing interest in more realistic virtual reality services has led to research and development of encoding and decoding of 3D digital contents, such as 3D motion pictures, in three dimensions according to temporal and spatial characteristics.

Image coding methods in formats such as moving picture experts group (MPEG)-4 Part 2 and H.264 Advanced Video Coding (AVC) are for coding 2D images and are focused on improving coding efficiency. However, methods of coding and reconstructing images are required in fields such as realistic telecommunications or virtual reality.

Therefore, the MPEG working group, a standard organization regarding image encoding, is endeavoring to set a standard in relation to 3D audio/video (3D AV) encoding.

FIG. 1 is a diagram showing a conventional method of providing 2D reference images and 3D additional information.

Referring to FIG. 1, a structure of a program map table (PMT) section of a transport stream (TS) packet is shown.

In related art, a program and a program element descriptor are added to the PMT and left/right image signals are separated into packetized elementary stream (PES) packets of each of the left/right image signals in order to insert 3D image information in the TS. In FIG. 1, a left image is referred as a reference image 110, and a right image is referred as 3D additional information 120.

The left/right image signals refer to image signals used in case where a stereoscopic format 3D image is generated by using a left-view image and a right-view image to encode a 3D image. In this case, the left-view image is set as base layer video, and the right-view image is set as enhancement layer video. The base layer video is an image which can be encoded into a 2D image by itself, whereas the enhancement layer video is an image additionally required for generating a 3D image by being added to the base layer video.

In this case, introducing a new system for broadcasting 3D digital contents imposes technological and financial burdens, and the new system's compatibility with conventional 2D digital broadcasting systems may also become an issue. Thus, a method for resolving the aforementioned problems is required.

SUMMARY OF THE INVENTION

The present invention provides a method and an apparatus for providing and receiving three-dimensional (3D) digital content by using conventional system for providing two-dimensional (2D) digital content.

According to an aspect of the present invention, there is provided a method of providing three-dimensional (3D) digital content, the method including generating an ES (elementary stream) regarding first data of two-dimensional (2D) digital content, generating an ES regarding second data of 3D digital content, packetizing the ESs of the first data and the second data, and recording the packetized second data and content information of the second data within header information of a multiplexed stream of the packetized first data.

The recording of the packetized second data and the content information of the second data may use an adaptation field prepared in header information of the multiplexed stream of the packetized first data.

The second data and the content information may be recorded in a transport private data field included in the adaptation field in the recording of the packetized second data and the content information of the second data.

The recording of the packetized second data and the content information of the second data may further include recording content type information for determining a type of data recorded in the transport private data field.

The recording of the packetized second data and the content information of the second data may further include recording stereoscopic format information indicating a format of additional information of 3D images, the information being recorded in the transport private data field.

The method may further include synchronizing time reference information of the first data and the second data.

The multiplexed stream may be either a TS (transport stream) or a PS (program stream).

The recording of the packetized second data and the content information of the second data may include recording content information of the packetized data in a system header of a pack header and program stream map information of the multiplexed stream of the packetized first data and the packetized second data, in a case where the multiplexed stream is the PS.

The method may further include determining a type of content included in the multiplexed steam by using descriptor information including video bound and content type of the system header.

According to another aspect of the present invention, there is provided an apparatus for providing 3D digital content, the apparatus including a first encoder generating an ES (elementary stream) regarding first data of 2D digital content, a second encoder generating an ES regarding second data of 3D digital content, a packetizing unit packetizing ESs of the first data and the second data, and a multiplexer recording the packetized second data and content information of the second data in header information of a multiplexed stream of the packetized first data.

According to another aspect of the present invention, there is provided a method of receiving 3D digital content, the method including receiving a multiplexed stream regarding first data, wherein the first data is packetized 2D digital content, analyzing second data, which is 3D digital content recorded in header information of the received multiplexed stream regarding the first data, and content information of the second data, and decoding the multiplexed stream by using the analyzed content information of the second data.

According to another aspect of the present invention, there is provided an apparatus for receiving 3D digital content, the apparatus including a data reception unit receiving a multiplexed stream regarding first data, wherein the first data is packetized 2D digital content, a demultiplexer analyzing second data, which is 3D digital content recorded in header information of the received multiplexed stream regarding the first data, and content information of the second data, and a decoder decoding the multiplexed stream by using the analyzed content information of the second data.

According to another aspect of the present invention, there is provided a computer readable recording medium having recorded thereon a computer program for executing a method of providing 3D digital content.

BRIEF DESCRIPTION OF THE DRAWINGS

The above and other features and aspects of the present invention will become more apparent by describing in detail exemplary embodiments thereof with reference to the attached drawings in which:

FIG. 2 is a flowchart showing a method of providing 3D digital content according to an embodiment of the present invention;

FIG. 3 is a diagram showing field information used to provide 3D digital content, according to an embodiment of the present invention;

DETAILED DESCRIPTION OF THE INVENTION

Figure 1:
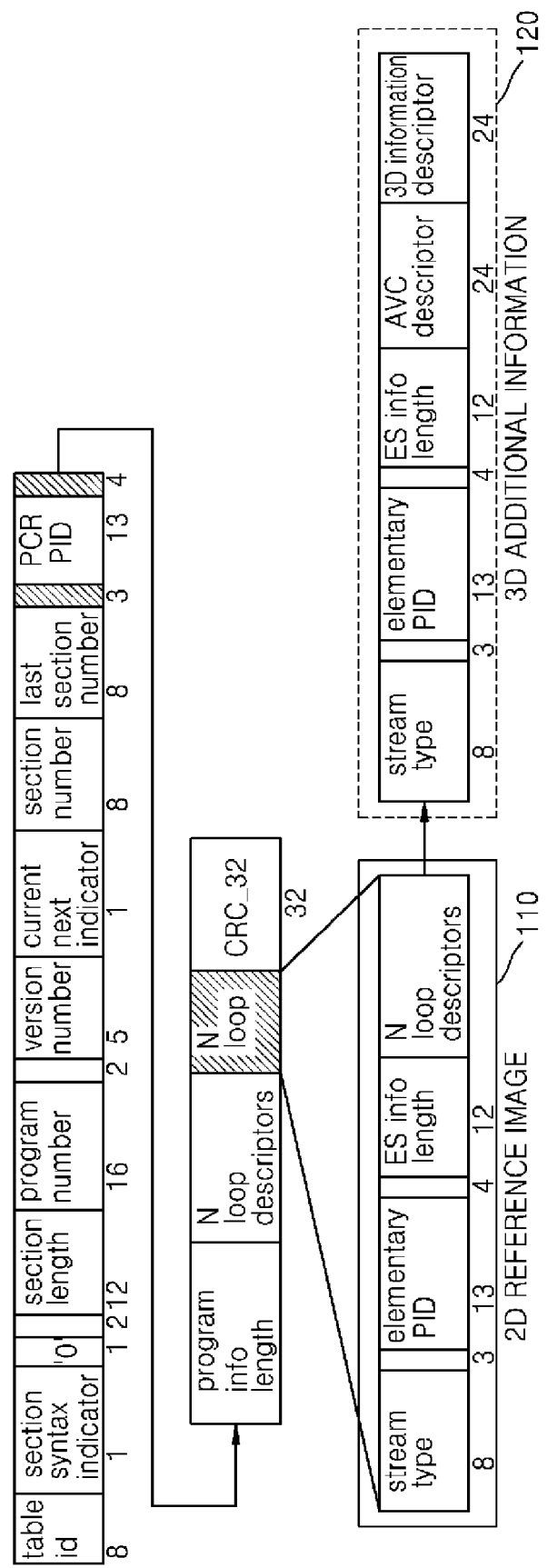
FIG. 1 is a diagram showing a conventional method of providing two-dimensional (2D) reference images and three-dimensional (3D) additional information.

The attached drawings for illustrating exemplary embodiments of the present invention are referred to in order to gain a sufficient understanding of the present invention, the merits thereof, and the objectives accomplished by the implementation of the present invention.

Hereinafter, the present invention will be described in detail by explaining exemplary embodiments of the invention with reference to the attached drawings.

In a motion picture expert group (MPEG) transport stream (TS), the present invention transmits a stream of two-dimensional (2D) content as a packetized elementary stream (PES) package within the transport stream as in the related art and uses an adaptation field (AF) of the TS for additional image information, which is three-dimensional (3D) information such as image data of stereoscopic images having different perspectives. Thus, the present invention enables 3D digital broadcasting while maintaining compatibility with a conventional digital broadcasting system.

Also, the present invention provides storage medium based 3D content to a user by providing relevant information to a pack header of a program stream (PS) in PS-based package media.

FIG. 2 is a flowchart showing a method of providing 3D digital content according to an embodiment of the present invention.

Referring to FIG. 2, the method of providing 3D digital content includes generating an elementary stream (ES) regarding first data of 2D digital content and an ES regarding second data of 3D digital content (operation 210), packetizing the ESs of the first data and the second data (operation 220), and recording the packetized second data and content information in header information of a multiplexed stream of the packetized first data (operation 230). Herein, the multiplexed stream is either a transport stream (TS) or a program stream (PS), both of which provide 3D digital content service by synchronizing time reference information among a plurality of packets of 3D digital content, wherein the time reference information includes values such as a program clock reference (PCR), a presentation time stamp (PTS), a decoding time stamp (DTS), etc.

Thus, in the case of serviced broadcasting being 3D, if a receiver is a conventional image processing system, 2D images are displayed without analyzing additional data recorded in a particular field (an AF, for example) within header information of a stream. If a receiver supports 3D stereoscopic images, values defined regarding data recorded in a transport private data field within the AF are analyzed and 3D images are reconstructed, wherein the data recorded in the transport private data refers to stereoscopic format data such as content_type information for determining whether an image is 2D or 3D, image data including stereoscopic images having different perspectives, depth data, and disparity data, for example.

Meanwhile, operations of a receiver includes receiving a multiplexed stream regarding the first data (which is the packetized 2D content), analyzing the second data (which is 3D content generated in header information of the multiplexed stream regarding the first data) and content information of the second data, and decoding the multiplexed stream by using the analyzed content information of the second data. Accordingly, the multiplexed stream can be displayed as either 2D images or 3D images.

Hereinafter, the method of providing 3D digital content according to the present invention will be described in detail by referring to a structure of a packet shown in FIGS. 3A and 3B.

FIGS. 3A and 3B are diagrams showing field information used for providing 3D digital content according to an embodiment of the present invention.

Referring to FIG. 3A, a basic structure of a packet is shown. A TS packet is basically a packet having a fixed length of 188 bytes and including header information and payload, wherein the payload refers to body of pure data to be transmitted. Also, as shown in FIG. 3A, AF header and AF data, regarding the AF, may be selectively added to the TS packet. Originally, an AF is a field including additional information regarding each stream and including null data (comprising stuffing bytes). The present invention uses advantages of the AF.

Referring to FIG. 3B, a case in which an AF is included in header information 310 is shown. At this point, AF controls, which are two bits of data within the header information 310, indicate that an AF exists in the packet.

Various fields are allocated in the header information. Among them, the present invention uses a transport private data region 340 of optional fields 330 existing within the inner field of an AF 320.

The transport private data region 340 includes a transport private data length field 341, which is length information, and a transport private data field 342 to which private data is recorded. The transport private data field 342 is a field for a user to use internal and proprietary data within a network, and is used to prevent an increase in network traffic without wasting payload capacity.

In the present invention, in order to provide 3D image data and additional information of content, the additional information is recorded in the transport private data field 342. Data to be recorded is information defined regarding stereoscopic format data such as content_type information for determining whether a image is 2D or 3D, image data including images in different perspective in stereoscopy R image, depth data, and disparity data as shown in Tables 1 and 2.

Table 1 below indicates contents type information for determining the type of data recorded within a transport private data field.

TABLE 1

| Value | Description |
|---|---|
| 0x00 | 2D |
| 0x01 | 3D (Stereoscopic) |
| 0x10 | 2D/3D Mixed |
| 0x11 | Reserved |

Table 2 below is stereoscopic format information designating type of additional information of 3D images, the additional information recorded in a transport private data field.

| Value | Description |
|---|---|
| 0x000 | Whole image of different perspective R image |
| 0x001 | Whole image of different perspective R image + Depth |
| 0x010 | Whole image of different perspective R image + Disparity |
| 0x011 | R image variable width (image of vertical half) |
| 0x100 | R image variable height (image of horizontal half) |
| 0x101 | Depth (or Disparity) |
| 0x110 | Depth (or Disparity) + residual |
| 0x111 | Reserved |

Moreover, other 3D relevant information may be recorded in a transport private data field, as shown in Table 3 below.

TABLE 3

| StereoscopicFormat | unsigned int(3) |
|---|---|
| LR_first | unsigned int(1) |
| StereoscopicInfo { | |
| OptimalDisplaySize | unsigned int(16) |
| OptimalViewingDistance | unsigned int(32) |
| Is_CamParams | unsigned int(1) |
| if(Is_CamParams=='1'){ | |
| Baseline | unsigned int(32) |
| Focallength | unsigned int(32) |
| Is_Cam_Cross | unsigned int(1) |
| if(Is_Cam_Cross=='1'){ | |
| rotation[ ] | unsigned int(32) |
| } | |
| } | |
| } | |
| if(contents type=='10'){ | |
| 3D_start_offset | unsigned int(32) |
| 3D_end_offset | unsigned int(32) |
| } | |

The terminology used in Table 3 above is described below.

(i) The "LR_first" determines whether the first image is either an "L image (reference image)" or an "R image (additional image)."

(ii) The "OptimalDisplaySize" indicates the size of a display optimized for 3D images.

(iii) The "OptimalViewingDistance" indicates a viewing distance optimized for 3D images.

(iv) The "IsCamParams" indicates the existence of camera parameters. The "Baseline" indicates a distance between parameters of left/right images. The "focallength" indicates a distance to an image plane. The "Is_Cam_Cross" determines whether an arrangement of a stereo camera is parallel or cross. The "rotation[ ]" indicates information regarding an angle corrected by the arrangement of the stereo camera.

(v) The "3D_start_offset" and the "3D_end_offset" are offset values indicating a starting point and an ending point of 3D images in the case where 2D images and 3D images are mixed.

For example, in the case of an enhanced-xVSB (vestigial sideband modulation) (E-xVSB) transmission method, additional information of 3D images can be added to a transport private data field within each of AFs of a normal stream of 2D images and a robust stream of 3D images and transmitted. Meanwhile, the additional information can be added to the robust stream only and transmitted. However, in the case of an advanced-VSB (A-VSB) transmission method, a robust stream of 3D images is loaded into an AF of a normal stream. Thus, the additional information of 3D images can simply be loaded into a transport private data field within an AF of the robust stream and transmitted.

Figure 4:
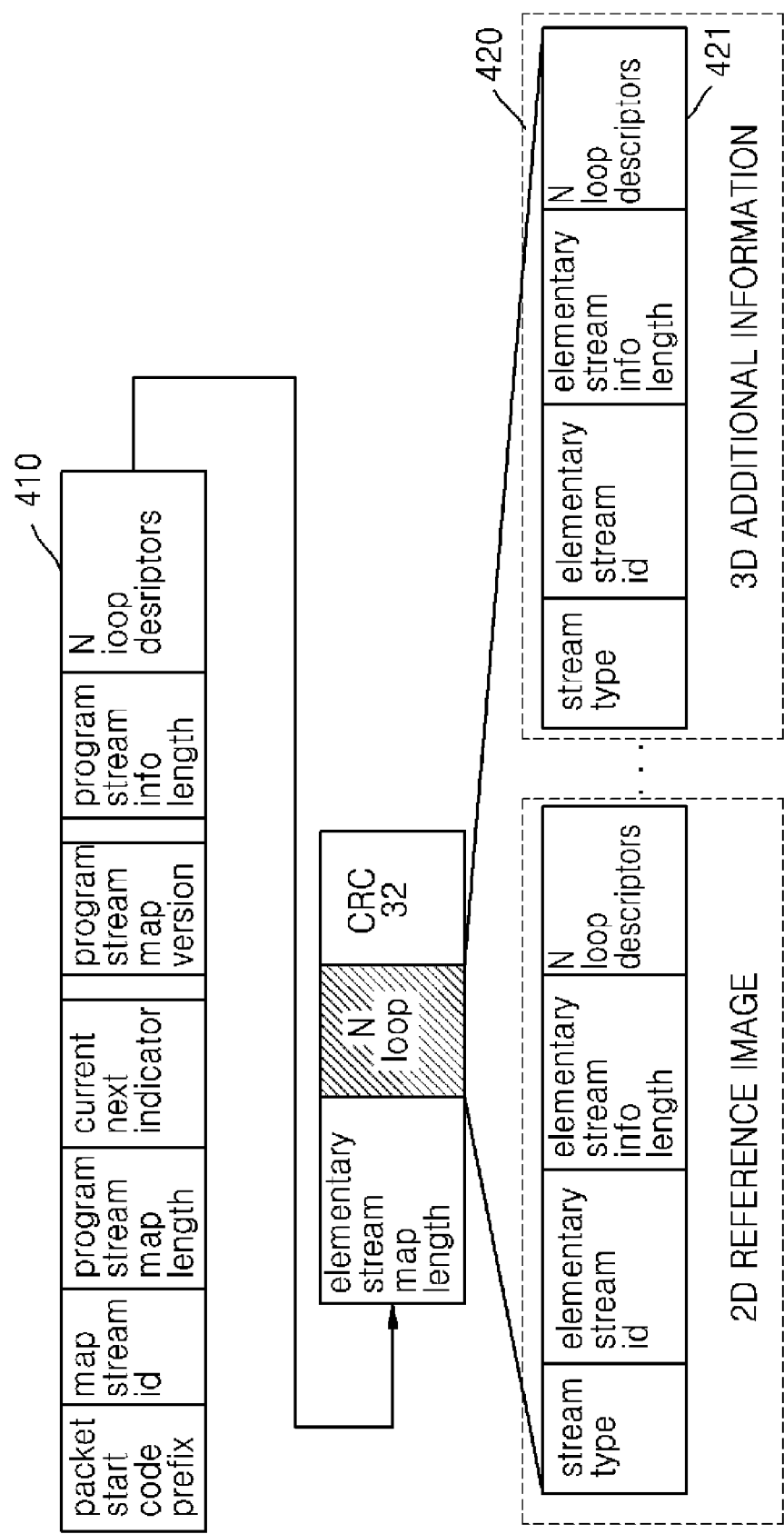
FIG. 4 is a diagram showing field information used to provide program stream (PS) based 3D digital content, according to another embodiment of the present invention.
Figure 5:
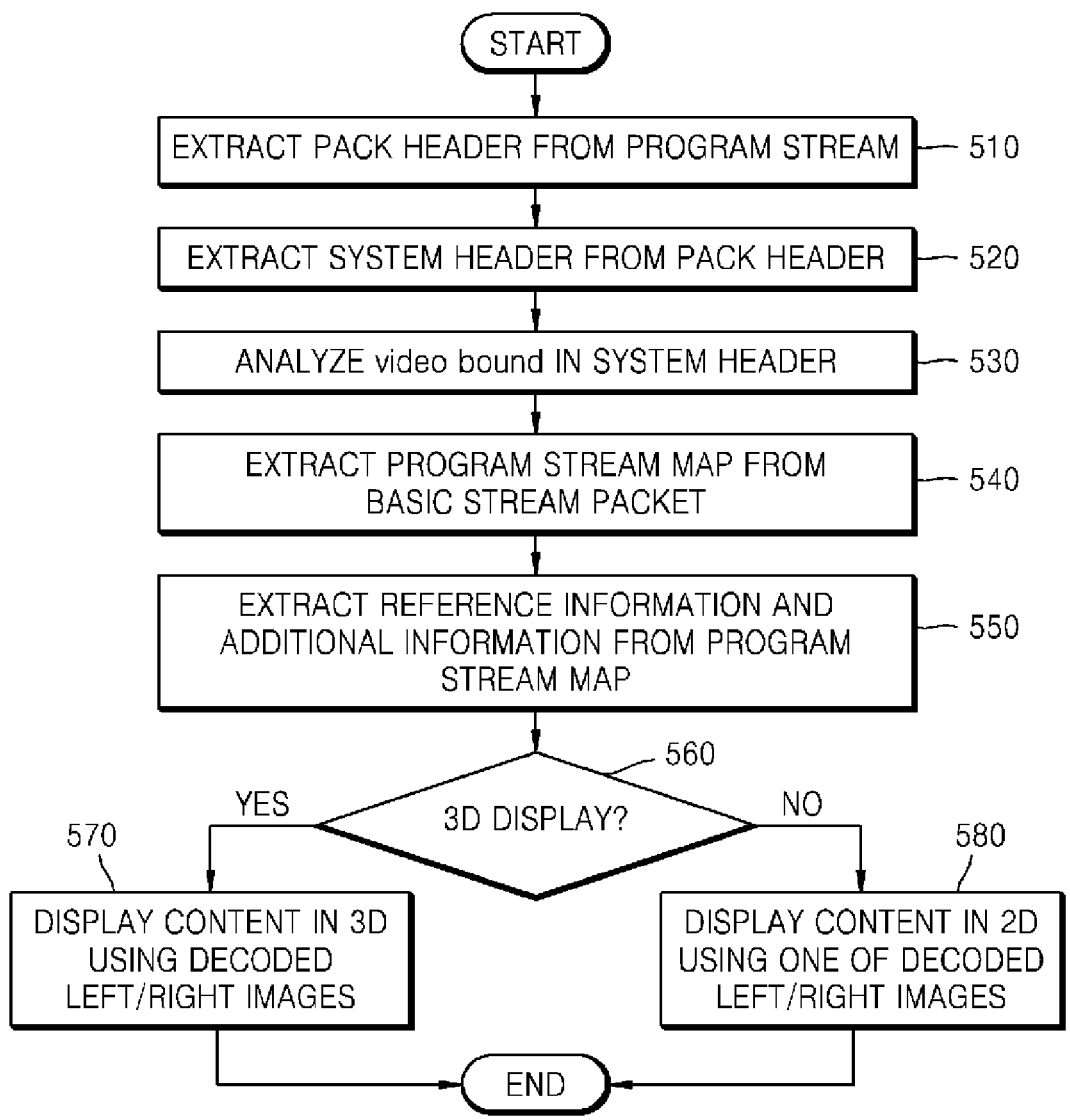
FIG. 5 is a diagram showing field information used to provide PS-based 3D digital content, according to another embodiment of the present invention.

FIG. 4 is a diagram showing field information used to provide PS-based 3D digital content, and FIG. 5 is a flowchart showing a method of providing PS-based 3D digital contents according to another embodiment of the present invention.

FIG. 4 shows a program stream map (PSM) format for describing analyzing information regarding a pack header of a PS providing 3D digital content in PS-based media.

Regarding analysis of the PS, a method of providing PS-based 3D digital content is shown in FIG. 5.

The method includes extracting pack header information from the PS to provide a 3D image service (operation 510), extracting system header information from the extracted pack header (operation 520), obtaining and analyzing information such as video_bound and buffer_bound from the system header information (operation 530), extracting a PSM from the PES (operation 540), and extracting ES identifiers (ID) for 2D reference images and 3D additional information data using the PSM (operation 550). A transmitted media stream is displayed after image reconstruction. However, it is determined whether images in the media stream are 3D images or 2D images (operation 560). If the images are 3D, the images are displayed in 3D by using left images and right images (operation 570). If the images are 2D, either the left images or the right images are extracted and are displayed in 2D (operation 580).

If a video_bound value in a system header extracted from a pack header indicates that there are two image streams (i.e. the video_bound value may be '2' instead of '1'), a PSM is extracted and contents type defined in "N loop descriptors" 410 shown in FIG. 4 is analyzed. Accordingly, it can be determined whether images are 2D or 3D. Herein, the content type is described in Table 1.

Moreover, in order to analyze additional information 420 of 3D images, stereoscopic format information indicating the type of additional information of 3D images defined in the "N loop descriptors" 421 and other three-dimension related information can be analyzed. The stereoscopic format information and the other 3D related information are described in Tables 2 and 3.

Figure 6:
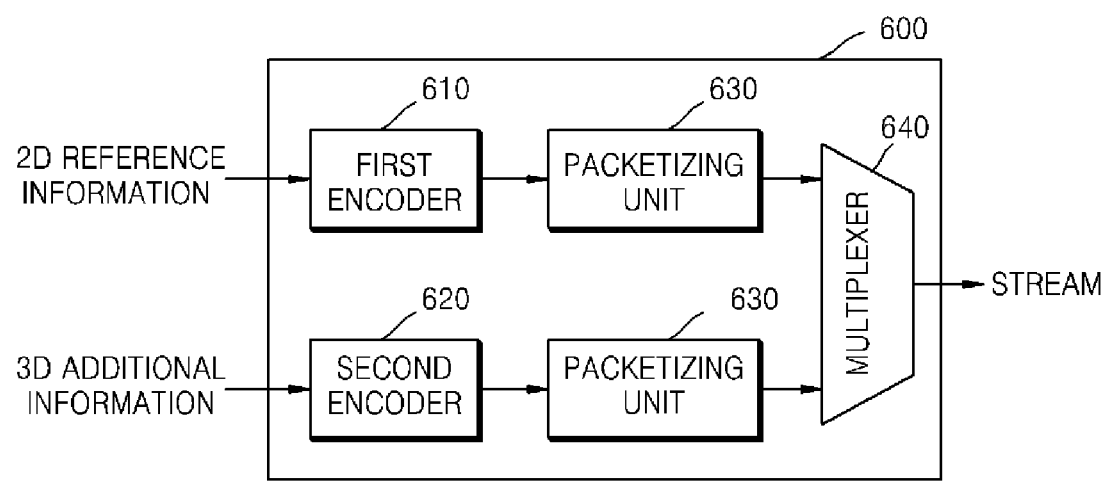
FIG. 6 is a function block diagram of an apparatus for providing 3D digital content, according to another embodiment of the present invention.
Figure 7:
FIG. 7 is a block diagram of an apparatus for receiving 3D digital content, according to an exemplary embodiment.

FIG. 6 is a function block diagram of an apparatus 600 providing 3D digital content, according to another embodiment of the present invention.

Referring to FIG. 6, the apparatus 600 includes a first encoder 610 generating an ES regarding first data of 2D digital content, a second encoder 620 generating an ES regarding second data of 3D digital content, a packetizing unit 630 packetizing the ESs of the first data and the second data, and a multiplexer 640 multiplexing the packetized first data and the packetized second data. The multiplexer 640 can record the second data and content information as header information of a multiplexed steam.

The multiplexer 640 generates either a TS or a PS, and synchronizes time reference information among a plurality of packets of 3D digital content, wherein the time reference information includes a PCR, a PTS, a DTS, etc.

Moreover, the multiplexer 640 performs multiplexing by using an AF, in which additional information and stuffing bytes are included, of stream, and more particularly, by using a transport private data field within the AF.

Also, an apparatus (not shown) for receiving 3D digital content, the apparatus corresponding to the apparatus 600, may include a data reception unit receiving a multiplexed stream regarding first data, wherein the first data is packetized 2D digital content, a demultiplexer analyzing second data, which is 3D digital content generated in header information of the received multiplexed stream regarding the first data, and content information of the second data, and a decoder decoding the multiplexed stream by using the analyzed content information of the second data.

Thus, the method and apparatus enable embodying a 3D digital content broadcasting system while maintaining compatibility with a conventional digital broadcasting system. That is, the method and apparatus are capable of providing 2D and 3D contents to a user. Thus, a more realistic 3D media service can be provided while maintaining compatibility with conventional media.

The methods of providing and receiving 3D digital content according to the present invention can be written as computer programs and can be implemented in general use digital computers that execute the programs using a computer readable recording medium.

Also, as stated above, the structure of data used in the present invention can be recorded in a computer readable recording medium by using various methods.

Examples of the computer readable recording medium include magnetic storage media (e.g., ROM, floppy disks, hard disks, etc.), and optical recording media (e.g., CD-ROMs, or DVDs). In another exemplary embodiment, the computer readable recording medium may include storage media such as carrier waves (e.g., transmission through the Internet).

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of providing three-dimensional (3D) digital content, the method comprising:
    generating an elementary stream (ES) of first data of two-dimensional (2D) digital content;
    generating an ES of second data of 3D digital content;
    packetizing the ESs of the first data and the second data; and
    multiplexing the packetized ESs of the first and the second data to generate a multiplexed stream, wherein the packetized ES of the second data and content information of the second data are added within header information of the multiplexed stream.

2. The method of claim 1, wherein the packetized ES of the second data and the content information of the second data are added to an adaptation field in the header information of the multiplexed stream.

3. The method of claim 2, wherein the multiplexing comprises adding the second data and the content information to a transport private data field in the adaptation field.

4. The method of claim 3, wherein the multiplexing further comprises adding content type information for determining a type of data in the transport private data field.

5. The method of claim 4, wherein the multiplexing further comprises adding stereoscopic format information in the transport private data field, the stereoscopic format information indicating a format of additional information of 3D images.

6. The method of claim 5, further comprising synchronizing time reference information of the first data and the second data.

7. The method of claim 6, wherein the multiplexed stream is either a transport stream (TS) or a program stream (PS).

8. The method of claim 7, wherein the multiplexing further comprises adding the content information of the packetized ES of the second data in a system header of a packet header and program stream map information of the multiplexed stream of the packetized ES of the first data and the packetized ES of the second data, in a case where the multiplexed stream is the PS.

9. The method of claim 8, further comprising determining a type of content in the multiplexed steam by using descriptor information including video bound and content type of the system header.

10. An apparatus for providing 3D digital content, the apparatus comprising:
    a first encoder which generates an elementary stream (ES) of first data of 2D digital content;
    a second encoder which generates an ES of second data of 3D digital content;
    a packetizing unit which packetizes the ESs of the first data and the second data; and
    a multiplexer which adds the packetized ES of the second data and content information of the second data in header information of a multiplexed stream of the packetized ES of the first data.

11. The apparatus of claim 10, wherein the multiplexer adds the packetized ES of the second data and the content information in an adaptation field in the header information of the multiplexed stream.

12. The apparatus of claim 11, wherein the multiplexer adds the second data and the content information in a transport private data field in the adaptation field.

13. The apparatus of claim 12, wherein the multiplexer adds contents type information for determining a type of data in the transport private data field.

14. The apparatus of claim 13, wherein stereoscopic format information is added in the transport private data field, the stereoscopic format information indicating a format of additional information of 3D images.

15. The apparatus of claim 14, wherein the multiplexer synchronizes time reference information of the packetized ES of the first data and the packetized ES of the second data.

16. A method of receiving 3D digital content, the method comprising:

receiving a multiplexed stream of first data, wherein the first data is packetized 2D digital content;

analyzing second data which is 3D digital content in header information of the received multiplexed stream of the first data, and content information of the second data; and decoding the multiplexed stream by using the analyzed content information of the second data.

17. An apparatus for receiving 3D digital content, the apparatus comprising:

a data reception unit which receives a multiplexed stream of first data, wherein the first data is packetized 2D digital content;

a demultiplexer which analyzes second data which is 3D digital content in header information of the received multiplexed stream of the first data, and content information of the second data; and a decoder which decodes the multiplexed stream by using the analyzed content information of the second data.

* * * * *